United States Patent
DiFazio et al.

(10) Patent No.: US 9,313,766 B2
(45) Date of Patent: Apr. 12, 2016

(54) BANDWIDTH MANAGEMENT (BWM) OPERATION WITH OPPORTUNISTIC NETWORKS

(71) Applicant: INTERDIGITAL PATENT HOLDINGS, INC., Wilmington, DE (US)

(72) Inventors: Robert A. DiFazio, Greenlawn, NY (US); Prabhakar R. Chitrapu, Blue Bell, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 131 days.

(21) Appl. No.: 13/907,833

(22) Filed: May 31, 2013

(65) Prior Publication Data

US 2013/0329598 A1    Dec. 12, 2013

Related U.S. Application Data

(60) Provisional application No. 61/654,169, filed on Jun. 1, 2012.

(51) Int. Cl.
| | |
|---|---|
| H04L 12/28 | (2006.01) |
| H04W 64/00 | (2009.01) |
| H04W 24/02 | (2009.01) |
| H04W 48/20 | (2009.01) |

(52) U.S. Cl.
CPC ............ *H04W 64/003* (2013.01); *H04W 24/02* (2013.01); *H04W 48/20* (2013.01); *H04W 64/006* (2013.01)

(58) Field of Classification Search
CPC . H04W 48/20; H04W 64/006; H04W 64/003; H04W 24/02
USPC .......................................................... 370/254
See application file for complete search history.

(56) References Cited

U.S. PATENT DOCUMENTS

2009/0286509 A1*  11/2009  Huber et al. .................. 455/410

OTHER PUBLICATIONS

S. Pack et al., "Efficient data access algorithms for ITS-based networks with multi-hop wireless links", Proc. of IEEE International Conference on Communications 2007 (ICC 2007), Glasgow, Scotland, Jun. 2007, 4785-4790.

(Continued)

*Primary Examiner* — Sai-Ming Chan
(74) *Attorney, Agent, or Firm* — Condo Roccia Koptiw LLP

(57) ABSTRACT

A BWM controller may be provide the capability to combine a lower speed, wide area network (WAN) that may have connectivity with an ONW that may have intermittent connectivity. This may be done, for example, to generate a multi-connection service that may provide connectivity that may take advantage of occasional high-speed ONW connection events.

18 Claims, 14 Drawing Sheets

(56) References Cited

OTHER PUBLICATIONS

S. Hong et al., "ICOW: Internet access in public transit systems", InterDigital Communications, LLC, King of Prussia, PA, Dec. 20, 2011, 1-31.

Amtrak, "AmtrakConnect Wi-Fi", https://web.archive.org/web/20120219122603/http://www.amtrak.com/servlet/ContentServer/AM_Content_C/1246044325520/1237405732514, Feb. 14, 2012, 2 pages.

Greyhound "Perks & Benefits", http://www.greyhound.com/Express/PerksAndBenefits.aspx, Feb. 14, 2012, 1 page.

N.Menon, "Bandwidth Management in Wireless Networks: Closing the Supply—Demand Gap", Broadband Traffic Management Congress, Nov. 16-18, 2010, 1-20.

$3^{rd}$ Generation Partnership Project (3GPP), RP-111377, "New Study Item Proposal: Mobile Relay for E-UTRA", CATT, CMCC, CATR, China Telecom, 3GPP TSG RAN#53, Fukuoka, Japan, Sep. 13-16, 2011, 6 pages.

J. Lendino, "Chryslers uconnect Turns Car into Wi-Fi Hotspot", www.pcmg.com, Jun. 27, 2008, 1 page.

M. Jerome, "BMW Adds Full Internet Access to Its iDrive," www.wired.com/autopia, May 5, 2008, 1 page.

3rd Generation Partnership Project (3GPP), TS 23.203, V8.12.0, "3rd Generation Partnership Project; Technical Specification Group Services and System Aspects; Policy and charging control architecture (Release 8)", Jun. 2011, 115 pages.

* cited by examiner

BANDWIDTH MANAGEMENT (BWM) OPERATION WITH OPPORTUNISTIC NETWORKS

CROSS REFERENCE TO RELATED APPLICATION

This application claims the benefit of U.S. Provisional Patent Application No. 61/654,169, filed Jun. 1, 2012, and entitled "BANDWIDTH MANAGEMENT (BWM) OPERATION WITH OPPORTUNISTIC NETWORKS," the contents of which are hereby incorporated by reference herein.

BACKGROUND

Many transportation systems, public and private, offer their customers Wi-Fi at their terminals and while in transit. The Wi-Fi access point available while in transit may use a wireless WAN as the backhaul, and that capacity may be shared among users. As a result, the Wi-Fi performance may not be as good as provided by a fixed access point, and the system operator may restrict the services available to the users. When in or close to a transit station, users may have to manually switch to a higher performance fixed Wi-Fi system. Such actions may be disruptive, and my not deemed worthwhile for a short stop (compared to the transit times between stops). The switch may interrupt data sessions and may require the user to reconnect and restart one or more sessions.

SUMMARY

A bandwidth management (BWM) controller may be provided. The BWM controller may include a processor that may be configured to perform a number of actions. A request for a data stream may be received. An opportunistic network access point (ONW AP) in proximity to a route may be determined. A message may be sent to the ONW AP to cache a portion of the data stream.

A BWM controller may be provided that may include a processor configured to perform a number of actions. A request for a data stream may be received. An ONW AP in proximity to a route may be determined. It may be determined that a first portion of the data stream may be received via an ONW AP and a second portion of the data stream may be received via a wide area network access point (WAN AP). The first portion of the data stream may be received via the ONW AP and the second portion of the data stream may be received via the WAN AP. A reconstructed data stream may be generated from the first portion of the data stream and the second portion of the data stream.

A BWM controller may be provided that may include a processor configured to perform a number of actions. A request for a data stream may be received. An ONW AP in proximity to a route may be determined. It may be determined that a first portion of a data stream may be sent via the ONW AP and a section portion of the data stream may be sent via a WAN AP. A first portion of the data stream may be sent via the ONW AP and the second portion of the data stream may be sent via the WAN AP.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1A:
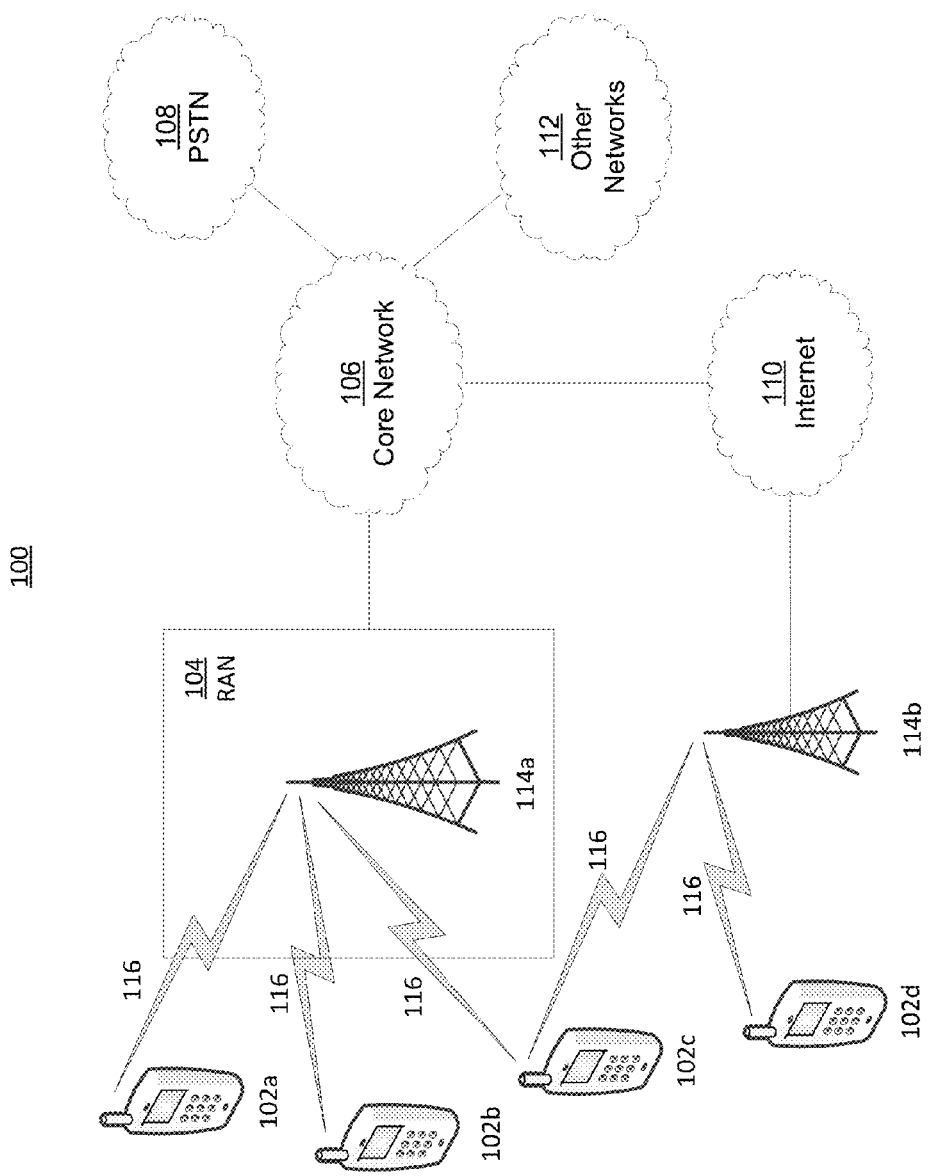
FIG. 1A depicts a system diagram of an example communications system in which one or more disclosed embodiments may be implemented.

An opportunistic network (ONW) may be a system that may have intermittent connectivity, for example, intervals of connectivity interspersed with intervals of no connectivity. The intervals of no connectivity may be longer than the intervals of connectivity. The connectivity provided, when available, may be a reliable, high data rate connection. ONWs may be used to intermittently transfer large blocks of data.

ONWs may provide intermittent connectivity due to the mobility of a user device, such as a wireless/transmit receive unit (WTRU). For example, a series on non-overlapping wireless hotspots may individually provide a connected and reliable service. When viewed as a system that may be used by a mobile user that traverses a path that comes into and out of coverage of the hotspots, the system may be referred to as an intermittent system, a system with intermittent connectivity, or an ONW. Other implementations of ONW may be possible. ONWs may provide intermittent connectivity due to sharing of a resource, for example, spectrum that may be shared among several systems or users, or hardware that may be shared among multiple systems or users.

In current systems, if a user is in transit, the user may not exploit the benefits of using multiple networks that may have different characteristics: one which may be available frequently with moderate QoS and one which may be available intermittently but provides high QoS, such as an ONW. Current systems may choose to ignore the ONW due to its intermittent characteristics. There may not be a way for current systems to know that when one ONW connection fails, another may be available in a short time. Even if the information may be available, current systems have no mechanism to use it. A current system may utilize the ONW when available; however, the user may not realize that at certain times streaming or large downloads are available. As a result, their online behavior and experience may be consistent with the poorer continuous connection rather than the aggregated network capability.

Embodiments described herein may utilize BWM to provide the capability to combine a lower speed, wide area network (WAN) that may have continuous connectivity with an ONW that may have intermittent connectivity. This may be done, for example, to generate a multi-connection service that may provide an enhanced continuous connectivity that may take advantage of occasional high-speed ONW connection events.

BWM Policy and multi-connection enhancements may be provided. BWM policy management may be enhanced to use the Quality of Service (QoS)/connectivity statistics of a continuous connection and the QoS/connectivity statistics of an intermittent connection as inputs to form decisions. These decisions may provide an improved user experience compared to using just one of the two networks.

BWM policy management may anticipate future connection events of the ONW and may queue or cache a subset of data and data requests from WTRUs in preparation for a connection event. BWM policy management may use a known or a learned transportation route or connectivity statistics to determine how much data may be queued or cached from WTRUs in preparation for a connection event. BWM policy management may use a known or a learned transportation route or connectivity statistics to determine when data collection from WTRUs may be stopped or throttled back. Connectivity statistics may include, for example, bandwidth, throughput, duration, or total quantity of data transfer estimated to be available at an anticipated connection event.

BWM policy management may anticipate future connectivity events of the ONW and may forward data to ONW network nodes to cache in preparation for transmission to the WTRUs. BWM policy management may use known or learned transportation route or connectivity statistics to determine how much data to forward to and cache at ONW network nodes in preparation for transmission to WTRUs. BWM policy management may use known or learned transportation route or connectivity statistics to determine when to stop or throttle back data collection from external networks. Connectivity statistics may include, for example, bandwidth, throughput, duration, or total quantity of data transfer estimated to be available at an anticipated connection event.

A bandwidth management (BWM) controller may be provided. The BWM controller may include a processor that may be configured to perform a number of actions. A request for a data stream may be received. The request for the data stream may be received from a wireless/transmit receive unit (WTRU), an eNode-B, a core network, a mobile access point (MAP), or the like. The request for the data stream may request that the data stream be received via the WAN AP. An ONW AP in proximity to a route may be determined. A message may be sent to the ONW AP to cache a portion of the data stream.

It may be determined that a portion of the data stream may be received via the opportunistic network access point (ONW AP) instead of a wide area network access point (WAN AP). It may be determined that a portion of the data stream may be received via an ONW AP by analyzing a characteristic of the request for the data stream. The characteristic of the request for the data stream may be an identity of a user requesting the data stream, a type of device requesting the data stream, a type of data included in the data stream, a size of the data stream, a source of the data stream, a priority value, or the like. It may be determined that the portion of the data stream should be received via an ONW AP by determining that the ONW AP provides an improved quality of service, an improved data rate, or a lower latency than a WAN AP. For example, a first quality of service (QoS) measurement may be received from the WAN AP. A second QoS measurement may be received for the ONW AP. The first QoS measurement and the second QoS measurement may be used to determine that a portion of the data stream should be received via the ONW AP. A QoS measurement may include a time, a location, a WTRU identification, a map identification, a vehicle identification, a transport system terminal identification, or the like. It may be determined that a portion of the data stream may be received via the ONW AP by determining that the ONW AP provides data at a lower cost than a WAN AP.

As disclosed herein, an ONW AP in proximity to a route may be determined in a number of ways. For example, a position may be determined for a device that sent the request for the data stream. The route may be determined using the position. The ONW AP may be selected from one or more potential ONW APs in proximity of the route. As another example, a current position and a direction of travel may be determined for a device that sent the request for the data stream. The route may be determined by comparing the current position and the direction of travel to a map of routes. The ONW AP may be selected from one or more potential ONW APs in proximity to the direction of travel. As another example, an estimated time of arrival may be determined based on a current location and a direction of travel for a device that sent the request for the data stream. The ONW AP may be determined using the estimated time of arrival.

A BWM controller may be provided that may include a processor configured to perform a number of actions. A request for a data stream may be received. An ONW AP in proximity to a route may be determined. It may be determined that a first portion of the data stream may be received via an ONW AP and a second portion of the data stream may be received via a wide access network access point (WAN AP). The first portion of the data stream may be received via the ONW AP and the second portion of the data stream may be received via the WAN AP. A reconstructed data stream may be generated from the first portion of the data stream and the second portion of the data stream. The reconstructed data stream may be sent to a device that sent the request for the data stream.

As disclosed herein, the reconstructed data stream may be generated in a number of ways. For example, the first portion of the data stream and the second portion of the data stream may be combined to form a combined data stream. The reconstructed data stream may be generated by removing duplicate data and repairing errors in the combined data stream.

A BWM controller may be provided that may include a processor configured to perform a number of actions. A request for a data stream may be received. An ONW AP in proximity to a route may be determined. It may be determined that a first portion of a data stream may be sent via the ONW AP and a second portion of the data stream may be sent via a WAN AP. A first portion of the data stream may be sent via the ONW AP and the second portion of the data stream may be sent via the WAN AP.

It may be determined that a portion of the data stream may be sent via the opportunistic network access point (ONW AP) instead of a wide area network access point (WAN AP). It may be determined that a portion of the data stream may be sent via an ONW AP by analyzing a characteristic of the request for the data stream. The characteristic of the request for the data stream may be an identity of a user requesting the data stream, a type of device requesting the data stream, a type of data included in the data stream, a size of the data stream, a source of the data stream, a priority value, or the like. It may be determined that the portion of the data stream should be sent via an ONW AP by determining that the ONW AP provides an improved quality of service, an improved data rate, or a lower latency than a WAN AP. For example, a first quality of service (QoS) measurement may be received from the WAN AP. A second QoS measurement may be received from the ONW AP. The first QoS measurement and the second QoS measurement may be used to determine that a portion of the data stream should be sent via the ONW AP. A QoS measurement may include a time, a location, a WTRU identification, a map identification, a vehicle identification, a transport system terminal identification, or the like. It may be determined that a portion of the data stream may be sent via an ONW AP by determining that the ONW AP provides data at a lower cost than a WAN AP.

As disclosed herein, an ONW AP in proximity to a route may be determined in a number of ways. For example, a position may be determined for a device that sent the request for the data stream. The route may be determined using the position. The ONW AP may be selected from one or more potential ONW APs in proximity of the route. As another example, a current position and a direction of travel may be determined for a device that sent the request for the data stream. The route may be determined by comparing the current position and the direction of travel to a map of routes. The ONW AP may be selected from one or more potential ONW APs in proximity to the direction of travel. As another example, an estimated time of arrival may be determined based on a current location and a direction of travel for a device that sent the request for the data stream. The ONW AP may be determined using the estimated time of arrival.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
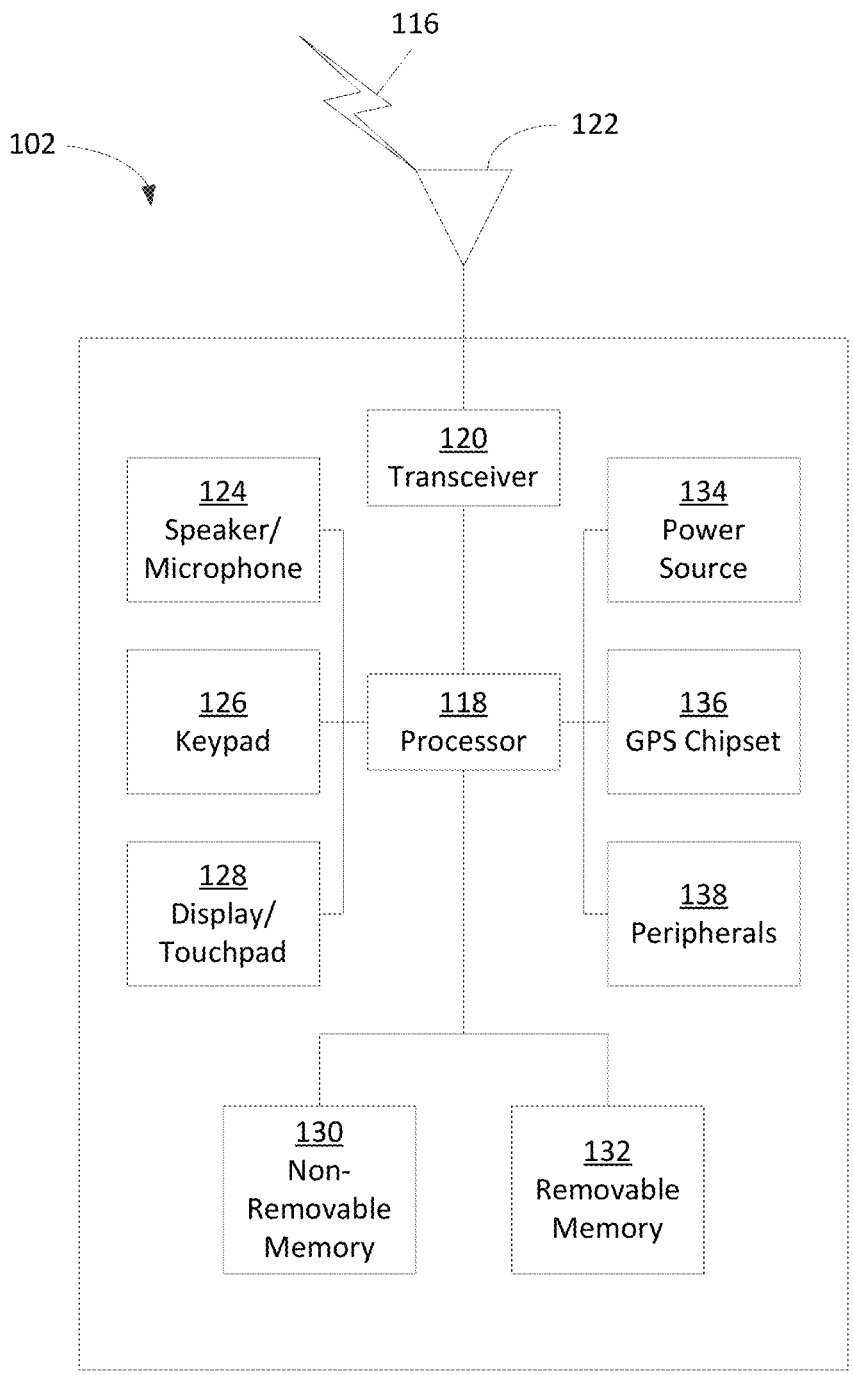
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
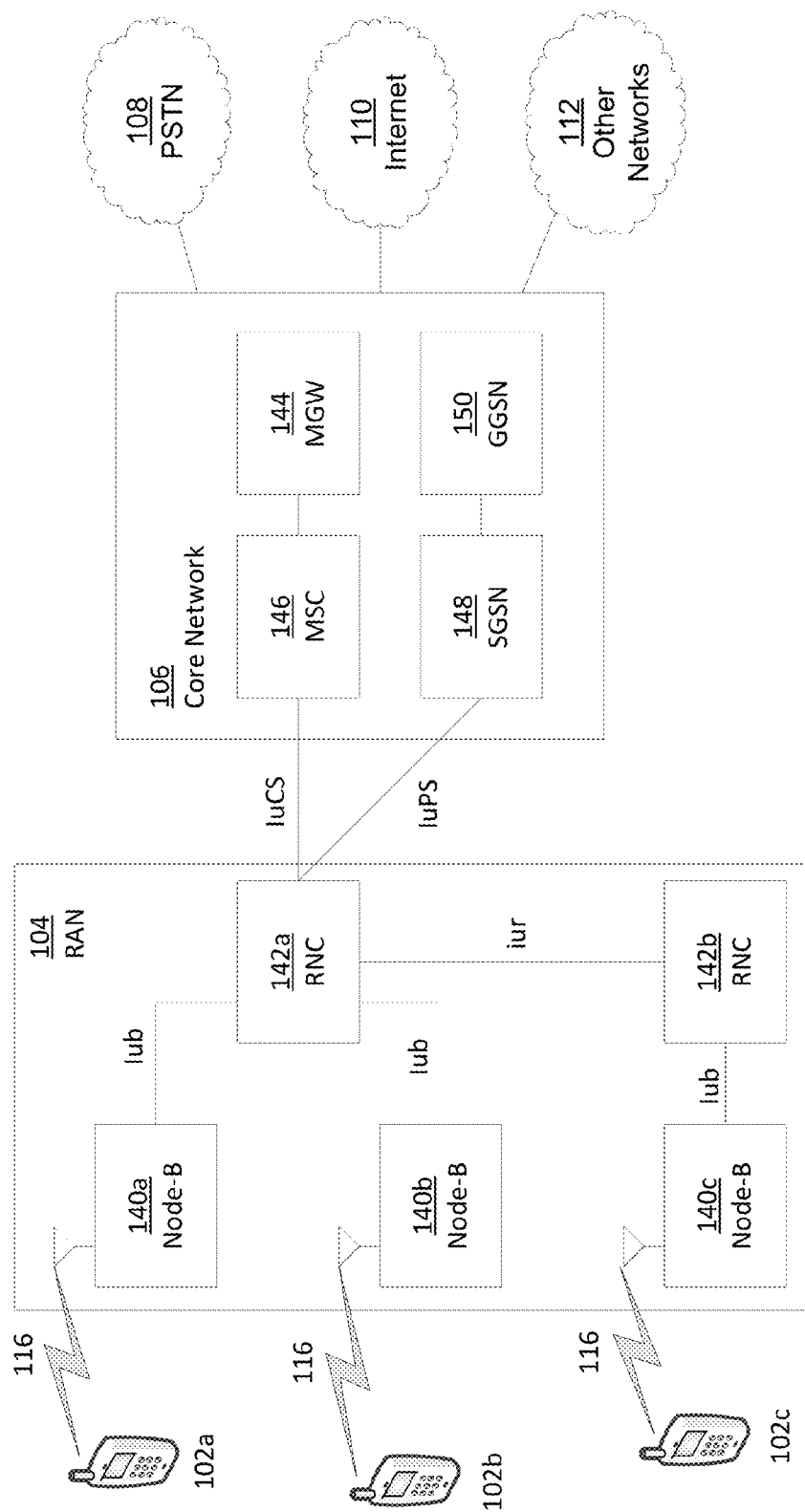
FIG. 1C depicts a system diagram of an example radio access network and an example core network that may be used within the communications system illustrated in FIG. 1A.

FIG. 1C is a system diagram of the RAN 104 and the core network 106a according to an embodiment. As noted above, the RAN 104 may employ a UTRA radio technology to communicate with the WTRUs 102a, 102b, 102c over the air interface 116. The RAN 104 may also be in communication with the core network 106a. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106a, it will be appreciated that any one of these elements may be owned and/or operated by an entity other than the core network operator.

The RNC 142a in the RAN 104 may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
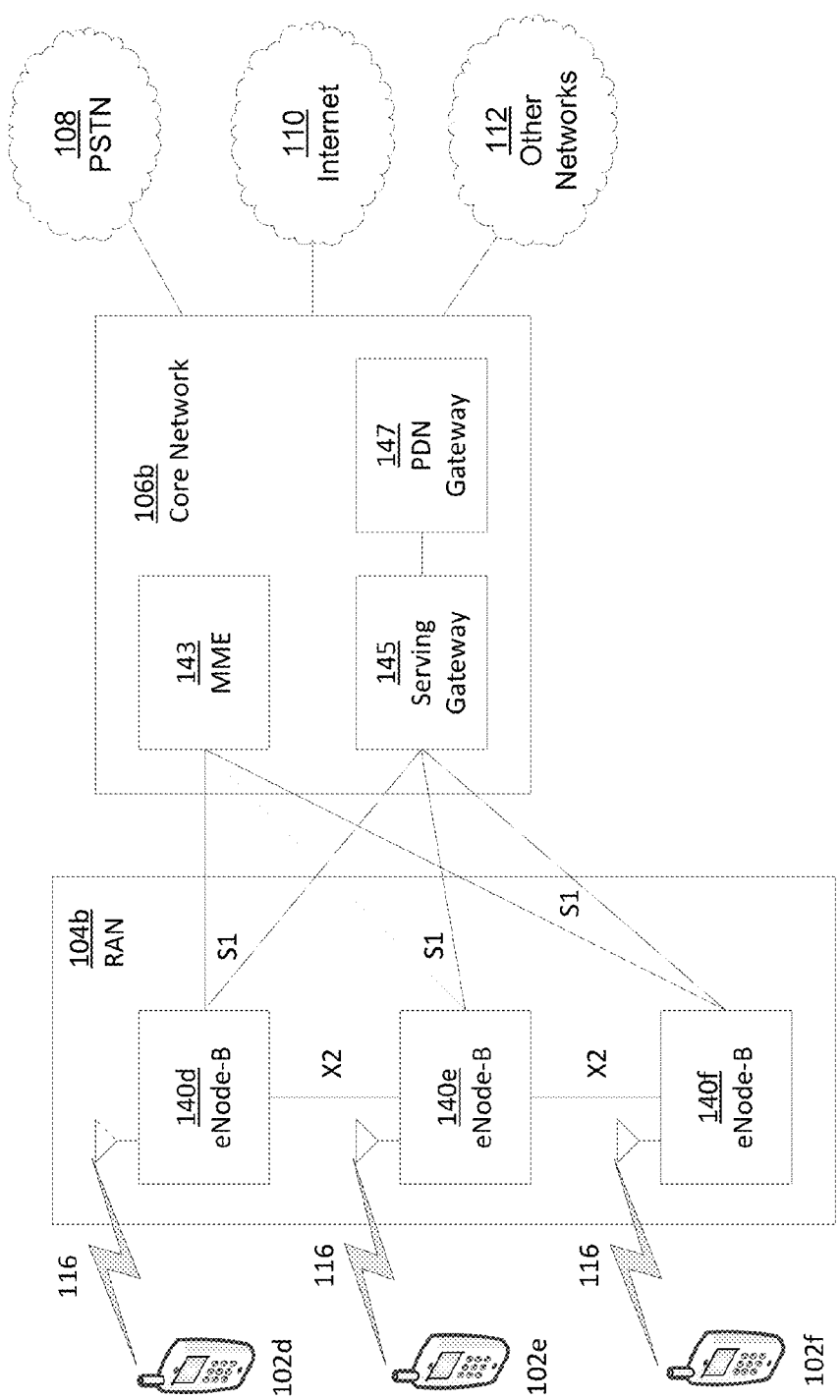
FIG. 1D depicts a system diagram of an example radio access network and an example core network that may be used within the communications system illustrated in FIG. 1A.

FIG. 1D is a system diagram of the RAN 104b and the core network 106b according to an embodiment. As noted above, the RAN 104b may employ an E-UTRA radio technology to communicate with the WTRUs 102d, 102e, 102f over the air interface 116. The RAN 104 may also be in communication with the core network 106b.

The RAN 104 may include eNode-Bs 140d, 140e, 140f, though it will be appreciated that the RAN 104 may include any number of eNode-Bs while remaining consistent with an embodiment. The eNode-Bs 140d, 140e, 140f may each include one or more transceivers for communicating with the WTRUs 102d, 102e, 102f over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102d.

Each of the eNode-Bs 140d, 140e, 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements are depicted as part of the core network 106b, it will be appreciated that any one of these elements may be owned and/or operated by an entity other than the core network operator.

The MME 143 may be connected to each of the eNode-Bs 140d, 140e, 140f in the RAN 104b via an S1 interface and may serve as a control node. For example, the MME 143 may be responsible for authenticating users of the WTRUs 102d, 102e, 102f, bearer activation/deactivation, selecting a particular serving gateway during an initial attach of the WTRUs 102d, 102e, 102f, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102d, 102e, 102f. The serving gateway 145 may also perform other functions, such as anchoring user planes during inter-eNode B handovers, triggering paging when downlink data is available for the WTRUs 102d, 102e, 102f, managing and storing contexts of the WTRUs 102d, 102e, 102f, and the like.

The serving gateway 145 may also be connected to the PDN gateway 147, which may provide the WTRUs 102d, 102e, 102f with access to packet-switched networks, such as the Internet 110, to facilitate communications between the WTRUs 102d, 102e, 102f and IP-enabled devices.

The core network 106b may facilitate communications with other networks. For example, the core network 106b may provide the WTRUs 102d, 102e, 102f with access to circuit-switched networks, such as the PSTN 108, to facilitate communications between the WTRUs 102d, 102e, 102f and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102d, 102e, 102f with access to the networks 112, which may include other wired or wireless networks that are owned and/or operated by other service providers.

Figure 1E:
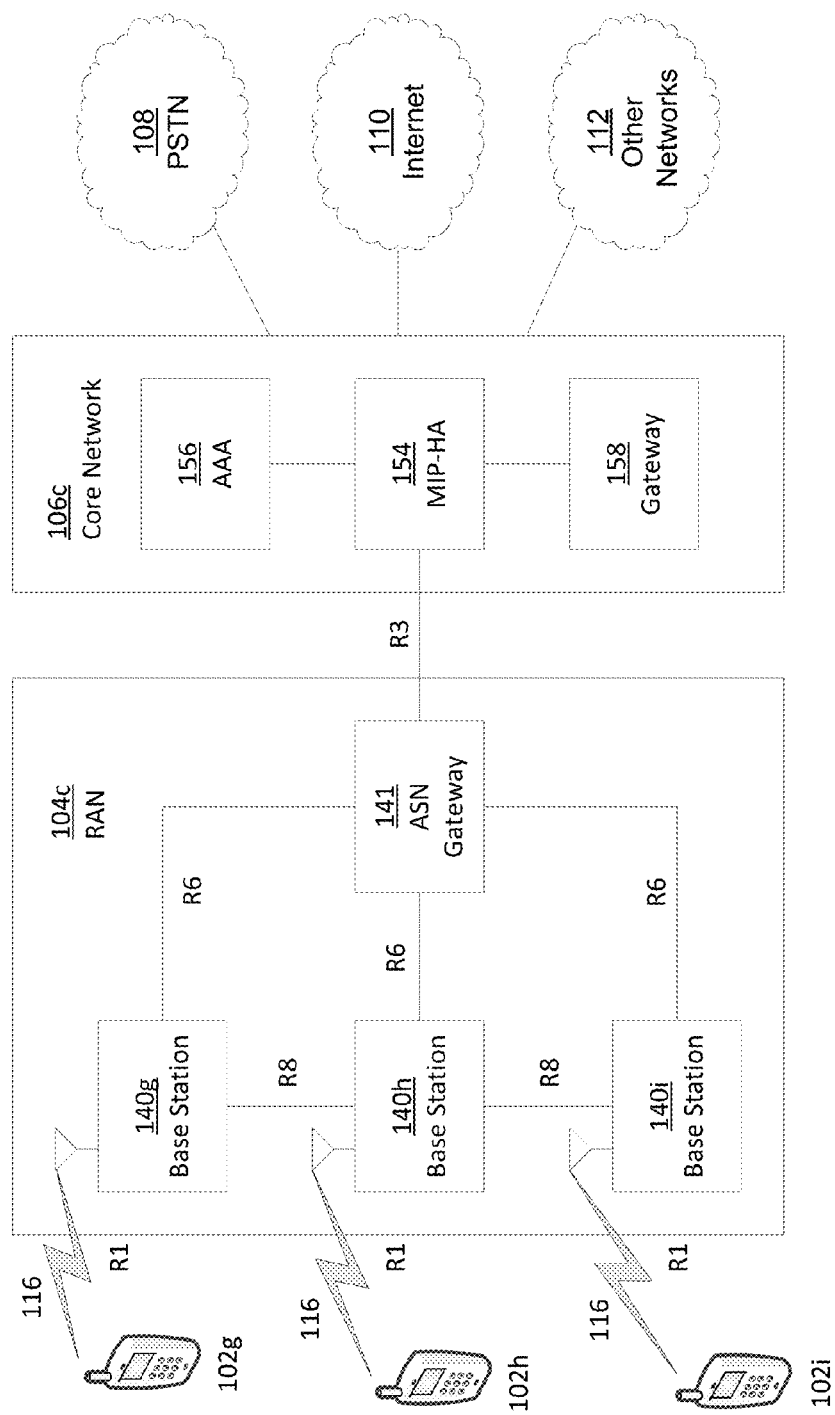
FIG. 1E depicts a system diagram of an example radio access network and an example core network that may be used within the communications system illustrated in FIG. 1A.

FIG. 1E is a system diagram of the RAN 104c and the core network 106c according to an embodiment. The RAN 104c may be an access service network (ASN) that employs IEEE 802.16 radio technology to communicate with the WTRUs 102g, 102h, 102i over the air interface 116. As will be further discussed below, the communication links between the different functional entities of the WTRUs 102g, 102h, 102i, the RAN 104c, and the core network 106c may be defined as reference points.

As shown in FIG. 1E, the RAN 104c may include base stations 140g, 140h, 140i, and an ASN gateway 141, though it will be appreciated that the RAN 104 may include any number of base stations and ASN gateways while remaining consistent with an embodiment. The base stations 140g, 140h, 140i may each be associated with a particular cell (not shown) in the RAN 104c and may each include one or more transceivers for communicating with the WTRUs 102g, 102h, 102i over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102g. The base stations 140g, 140h, 140i may also provide mobility management functions, such as handoff triggering, tunnel establishment, radio resource management, traffic classification, quality of service (QoS) policy enforcement, and the like. The ASN Gateway 141 may serve as a traffic aggregation point and may be responsible for paging, caching of subscriber profiles, routing to the core network 106c, and the like.

The air interface 116 between the WTRUs 102g, 102h, 102i and the RAN 104c may be defined as an R1 reference point that implements the IEEE 802.16 specification. In addition, each of the WTRUs 102g, 102h, 102i may establish a logical interface (not shown) with the core network 106c. The logical interface between the WTRUs 102g, 102h, 102i and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102g, 102h, 100i.

As shown in FIG. 1E, the RAN 104 may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements may be depicted as part of the core network 106c, it will be appreciated that any one of these elements may be owned and/or operated by an entity other than the core network operator.

The MIP-HA may be responsible for IP address management, and may enable the WTRUs 102g, 102h, 102i to roam between different ASNs and/or different core networks. The MIP-HA 154 may provide the WTRUs 102g, 102h, 102i with access to packet-switched networks, such as the Internet 110, to facilitate communications between the WTRUs 102g, 102h, 102i and IP-enabled devices. The AAA server 156 may be responsible for user authentication and for supporting user services. The gateway 158 may facilitate interworking with other networks. For example, the gateway 158 may provide the WTRUs 102g, 102h, 102i with access to circuit-switched networks, such as the PSTN 108, to facilitate communications between the WTRUs 102g, 102h, 102i and traditional landline communications devices. In addition, the gateway 158 may provide the WTRUs 102g, 102h, 102i with access to the networks 112, which may include other wired or wireless networks that are owned and/or operated by other service providers.

Although not shown in FIG. 1E, it will be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102g, 102h, 102i between the RAN 104c and the other ASNs. The communication link between the core network 106c and the other core networks may be defined as an R5 reference, which may include protocols for facilitating interworking between home core networks and visited core networks Bandwidth management technology may be used to extend opportunistic network (ONW) concepts. The ONWs may have short intervals of very high speed, highly reliable connectivity interspersed with long intervals of no connectivity.

Figure 2:
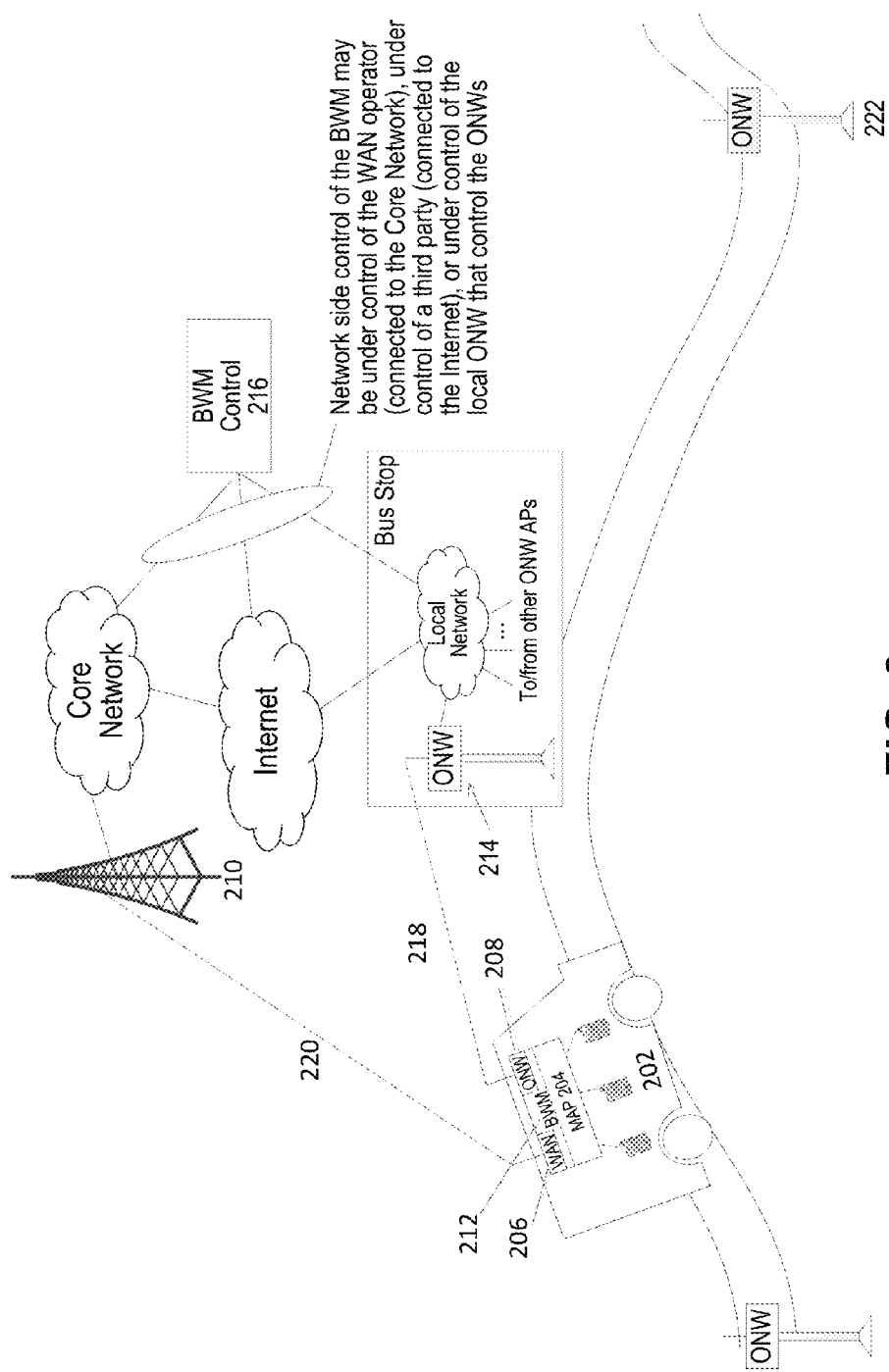
FIG. 2 depicts an ONW with BWM added that may provide improved performance.

FIG. 2 depicts an ONW with BWM added that may provide improved performance.

BWM may provide the capability to combine a lower speed, wide area network (WAN) that may have continuous connectivity, such as at 220, with an ONW that may have intermittent connectivity, such as at 218. The resulting multi-connection service may provide a continuous connectivity that may provide occasional high-speed ONW connections.

For example, a bus, such as the vehicle at 202, may include an access point (AP), such as mobile access point (MAP) 204. MAP 204 may provide backhaul via both a cellular radio access network (RAN), which may frequently be available, and a Wi-Fi connection, that may be available at or near a bus stop. MAP 204 may include modules WAN 206 and/or ONW 208. MAP 204 may use module WAN 206 to communicate with a cellular RAN and may communicate with an eNode-B, such as eNode-B 210. MAP 204 may use module ONW 208 to communicate with ONWs, such as Wi-Fi access points.

As shown in FIG. 2, a Wi-Fi connection, such as one provided by ONW 214, may be available over short time intervals while at the bus stop, and these connection events may occur at a stop that may be separated by longer intervals. Many other use cases may be envisioned where a user may have a WAN connection but may be mobile along a predictable path, such as a highway or flight path, and may come in and out coverage of high speed networks.

Though the system in FIG. 2 uses the example of LTE with an eNode-B and Wi-Fi, the systems described in this and other examples may use any combination of networks where one is a wide area network and the other an ONW. For example, a wide area cellular network such as a 3G WCDMA network and an ONW based on LTE hotpsots; a combination of a persistent wide area LTE cellular network and an ONW based on LTE hotspots; or other combinations of persistent and ONWs may use the techniques described herein.

BWM Policy and multi-connection enhancements may be provided. For example, MAP 204 may include module BWM 212, which may include the BWM function that may include the BWM policy and control and may provide multi-connection enhancements. As another example, BWM policy and multi-connection enhancements may be provided to MAP 204 by BWM Control 216.

BWM function, which may occur at 212 and/or 216, may use the Quality of Service (QoS)/connectivity statistics of a continuous connection and the QoS/connectivity statistics of an intermittent connection as inputs to form decisions. These decisions may provide an improved user experience compared to using one network.

For example, both the connection at 220 and the intermittent connection at 218 may be maintained as active connections. As another example, multiple active connections may be used to provide a long-term improvement in average throughput that may have fewer connection/disconnection/reconfiguration events.

The BWM function may anticipate future connection events of the ONW and may queue or cache a subset of data and data requests from WTRUs in preparation for a connection event. The BWM function may use a known or a learned transportation route or connectivity statistics to determine how much data may be queued or cached from WTRUs in preparation for a connection event. The BWM function may use a known or a learned transportation route or connectivity statistics to determine when data collection from WTRUs may be stopped or throttled back. Connectivity statistics may include, for example, bandwidth, throughput, duration, or total quantity of data transfer estimated to be available at an anticipated connection event.

The BWM function, which may occur at 208 and/or 216, may anticipate future connectivity events of the ONW and may forward data to ONW network nodes to cache in preparation for transmission to the WTRUs. For example, the BWM function may anticipate that vehicle 202 is arriving at ONW 214. As another example, the BWM function may detect that vehicle 202 is moving away from ONW 214 and may anticipate that vehicle 202 may arrive at ONW 222.

The BWM function may use known or learned transportation route or connectivity statistics to determine how much data to forward to and cache at ONW network nodes in preparation for transmission to WTRUs. The BWM function may use known or learned transportation route or connectivity statistics to determine when to stop or throttle back data collection from external networks. Connectivity statistics may include, for example, bandwidth, throughput, duration, or total quantity of data transfer estimated to be available at an anticipated connection event.

A multi-connection ID may be defined such that when one of the connections may be intermittently disrupted, the multi-connections may not either be defaulted to a single connection or torn down. The characteristics of the intermittency may be learnt in real-time, based on historical data, or a combination thereof. The decision thresholds may be adapted to suit the particular mobility scenario.

A system with intermittent connectivity that may know or learn the transportation route used by vehicles or users that traverse the network may use the information to forward data flows and requests. A system with intermittent connectivity may gather connectivity, QoS related statistics, arrival statistics, departure statistics at a place with connectivity (e.g., "bus stop"), or the like and may create a database containing the statistics.

An application on a WTRU, or enhancements to an existing application (e.g., a connection manager), may identify use of the intermittent network and/or may provide an indication to the user of performance parameters of the individual and/or combined network operation.

The embodiments described with regard to vehicles may be extended to mobility in Small Cell Networks, where the Small Cell connection may be intermittent due to user mobility. Additionally, the embodiments may also be applied to augmented unreliable networks such as TVWS or mmW links, such may be augmented by Macro-Cellular links.

Access to an intermittent link may be orchestrated by an opportunistic BWM server. Authentication and access to the intermittent network may be done between the BWM server and a cooperative network, such as Boingo. The opportunistic Wi-Fi service may be provided to multiple operators who may have deployed respective MAPs in a vehicle. The Wi-Fi bandwidth may be shared across the multiple Operators and may be managed according to SLAs between the Cellular Operators and the neutral Wi-Fi Host.

Maintaining continuous broadband connections for a mobile user, particularly in a high-speed vehicle, may pose a challenge. Cellular connectivity offers wide-area, but may be highly variable throughput that may be dependent on a WTRU's position relative to base stations and network congestion. Small cells may be a path to increasing throughput, but building sufficiently dense infrastructure along a transportation corridor may be costly and may require a system with mobility and hand-off capability consistent with high-speed vehicles rapidly moving in and out of coverage of individual infrastructure devices.

Referring again to FIG. 2, an example of an ONW Access Point may be shown at 214 and at 222 along a transportation route. The coverage area of the ONW AP may be an area in and around the AP, and may not be large enough to overlap with the coverage area of the previous or next ONW AP along the route. Vehicle 202 may enter the coverage area of ONW AP 214, achieve connectivity, and may lose the connection on exiting the coverage area. The vehicle may enter the coverage area of another ONW AP, such as ONW AP 222, and the cycle may repeat. For example, coverage durations and outage times between events may be an average dwell time of 26.0 seconds at a stop and an average of 65.4 seconds between stops.

The ONW AP may be connected to the Internet, a local ONW network, or the like. It may have connections to other ONR APs to forward or receive user or control plane data for passengers or control data for the ONW network.

The embodiments may improve user experience. For example, consider a dwell time of 26.0 seconds and an inter-arrival time of 65.4 seconds, equal to the average values mentioned above. The WAN may provide a continuous data rate of 5 Mbps for the full 26.0+65.4=91.4 seconds. This may allow a transfer of 57.1 Mbytes of data. If the ONW connection may provide 100 Mbps for the 26-second dwell time. This may provide a transfer of 325.0 Mbytes. The average data rate may be (26.0+65.4=91.4 seconds) approximately 33 Mbps. A combination of the two RATs may provide a moderate level of service continuously, augmented by good service intermittently. The overall user experience may be better than either RAT alone and may be transparent to the users.

The average performance may be insensitive to the variability of the WAN network, which may be moving from cell center to cell edge as base stations may be approached and passed, and may see significant variation in its data rate. If the WAN rate may be assumed to be 1 Mbps instead of 5 Mbps, the average rate may decreases to about 29 Mbps from 33 Mbps.

Although embodiments disclosed herein may discuss the combination of at least one WAN and at least one ONW (which may comprises one or more ONW APs), the concepts may be extended to multiple WANs and multiple ONW networks.

Figure 3:
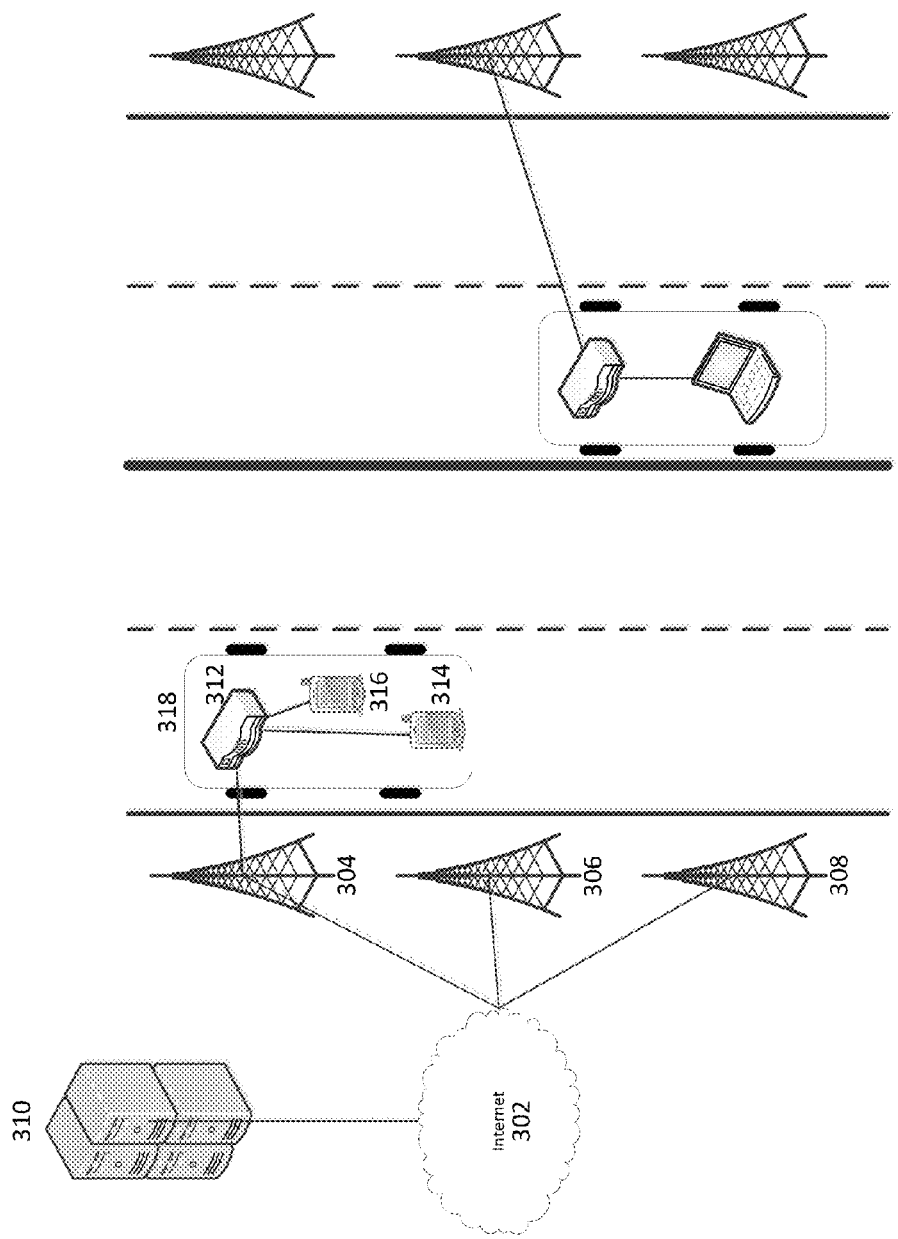
FIG. 3 depicts wireless data access in a network that may include multi-hop wireless links.

FIG. 3 depicts wireless data access in a network that may include multi-hop wireless links. As shown in FIG. 3, ONW access points, such as 304, 306, and 308 may be used to provide data to WTRU 316 and WTRU 314 via AP 312. For example, WTRU 316 may be located on vehicle 318, which may be traveling. WTRU 316 may be able to communicate with AP 213. WTRU 316 may request a data stream from AP 312. AP 312 may communicate the data stream request to server 310 via ONW APs, 304, 306, and/or 308. AP 312 may communicate the data stream request to server 310 via a cellular connection. Server 310 may detect that vehicle 318 is near ONW AP 304, but is approaching AP 306. Server 310 may determine a first portion of the requested data stream that may be sent to AP 312 while AP 312 may be within range of ONW AP 304. Server 310 may determine a second portion of the requested data stream that may be sent to AP 312 while AP 313 may be within range of ONW AP 306. Server 310 may determine that the remaining portion of the requested data stream may be sent to AP 312 while AP 313 may be within range of ONW AP 308. ONW AP 304 may receive the first portion of the requested data stream and may send the first portion to the AP 312 and AP 312 may send the data to WTRU 316, may cache the data, or may cache a portion of the data and may send a portion of the data to WTRU 316. ONW AP 306 may receive the second portion of the requested data stream and may cache the data. When AP 312 may be within range of ONW AP 306, ONW AP 306 may send the second portion to AP 312. ONW AP 308 may receive the remaining portion of the requested data stream and may cache the data. When AP 312 may be within range of ONW AP 308, ONW AP 308 may send the remaining portion to AP 312.

Figure 4:
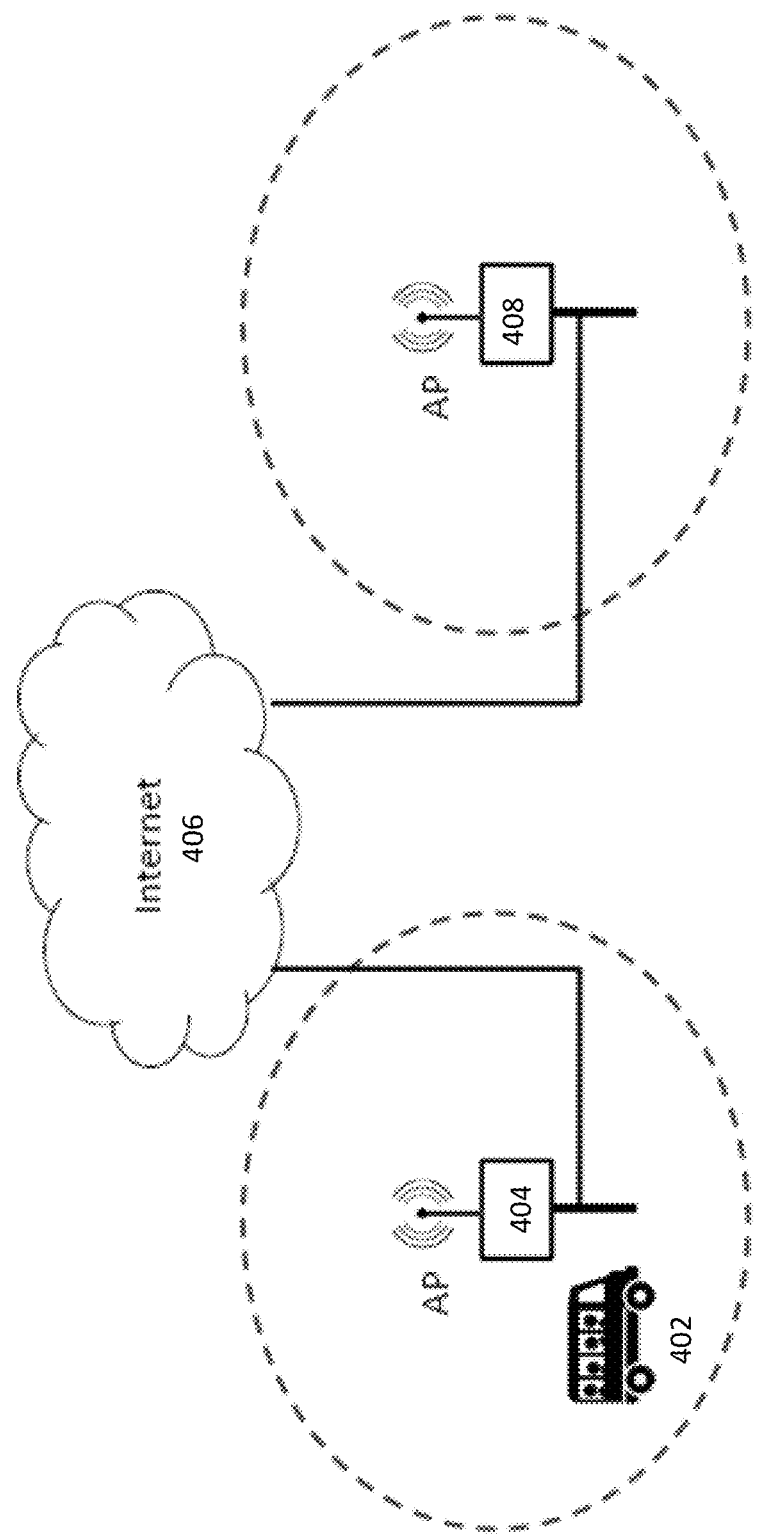
FIG. 4 depicts a public transit system that may include access points (AP).

FIG. 4 depicts a public transit system that may include access points (AP). Many transportation systems, public and private, offer their customers Wi-Fi at their terminals, such as at 404 and 408, and while in transit. The Wi-Fi access point available while in transit may use a wireless WAN as the backhaul, and that capacity may be shared among users. As a result, the Wi-Fi performance may not be as good as provided by a fixed access point at a terminal, and the system operator may restrict the services available to the users while in transit.

Currently, there are no mechanisms to provide continuity between terminals and/or connections in transit. For example, when vehicle 402 is in or close to a station, users may have to manually switch to a Wi-Fi access points, such as AP 404 and 408. Or, a connection manager in WTRU may switch to Wi-Fi access points, such as AP 404 and 408, with or without the consent or knowledge of the user. Such actions may be disruptive, and may not deemed worthwhile for a short stop. The switch may interrupt data sessions and may require the user to reconnect and restart one or more sessions.

Figure 5:
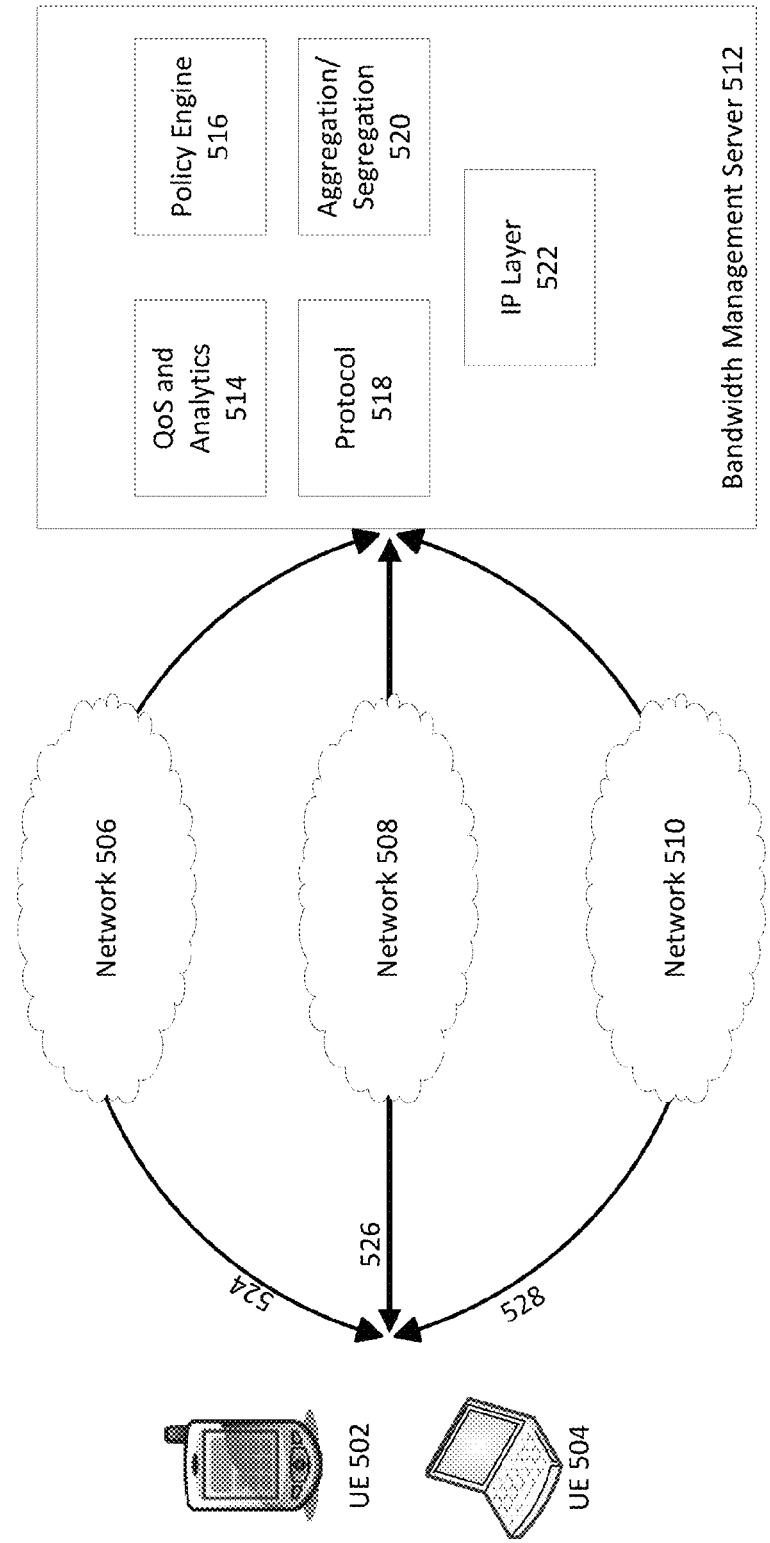
FIG. 5 depicts bandwidth management server that may allow for the use of multiple networks.

FIG. 5 depicts a bandwidth management server, such as bandwidth management server 512, that may allow for the use of multiple networks.

As shown in FIG. 5, UE 502 and UE 504 may communicate with BWM server 512 via network 506, network 508, and/or network 510. Network 506, network 508, and/or network 510 may be a cellular network, a network of ONW APs, or the like. BWM server 512 may include QoS and Analytics 514, Policy Engine 516, Protocol 518, Aggregation/Segregation 520, and IP Layer 522. QoS and Analytics 514 may provide QoS measurements and/or analysis of QoS measurements for an AP within network 506, network 508, and/or network 510. Policy engine 516 may provide rules, which are further described herein, to enable BWM server 512 to determine what network to use to deliver a data stream or a portion of a data stream. Protocol 518 may provide protocols and/or interfaces that may allow BWM server 512 to communicate with network 506, network 508, network 510, UE 502, and/or UE 504. IP layer 522 provide IP related protocols and/or interfaces that may allowed BWM server 512 to communicate with network 506, network 508, network 510, UE 502, and/or UE 504. Aggregation/Segregation 520 may allow BWM server 512 to aggregate or segregate one or more network to deliver data. For example, Aggregation/Segregation 520 may allow BWM server to deliver data using network 508 and network 510.

The embodiments disclosed herein may provide the capability to use multiple networks simultaneously based on user policies, operator policies, and preconfigured or measured parameters of a network where at least one of the networks is an ONW. BWM, such as BWM server 512, may be used with one network being a WAN and the other being a set of ONW APs that may regularly connect and disconnect.

BWM server 512 may enable continuously available WAN to be combined with an intermittent broadband connectivity of ONWs in a multi-connection system.

Figure 6:
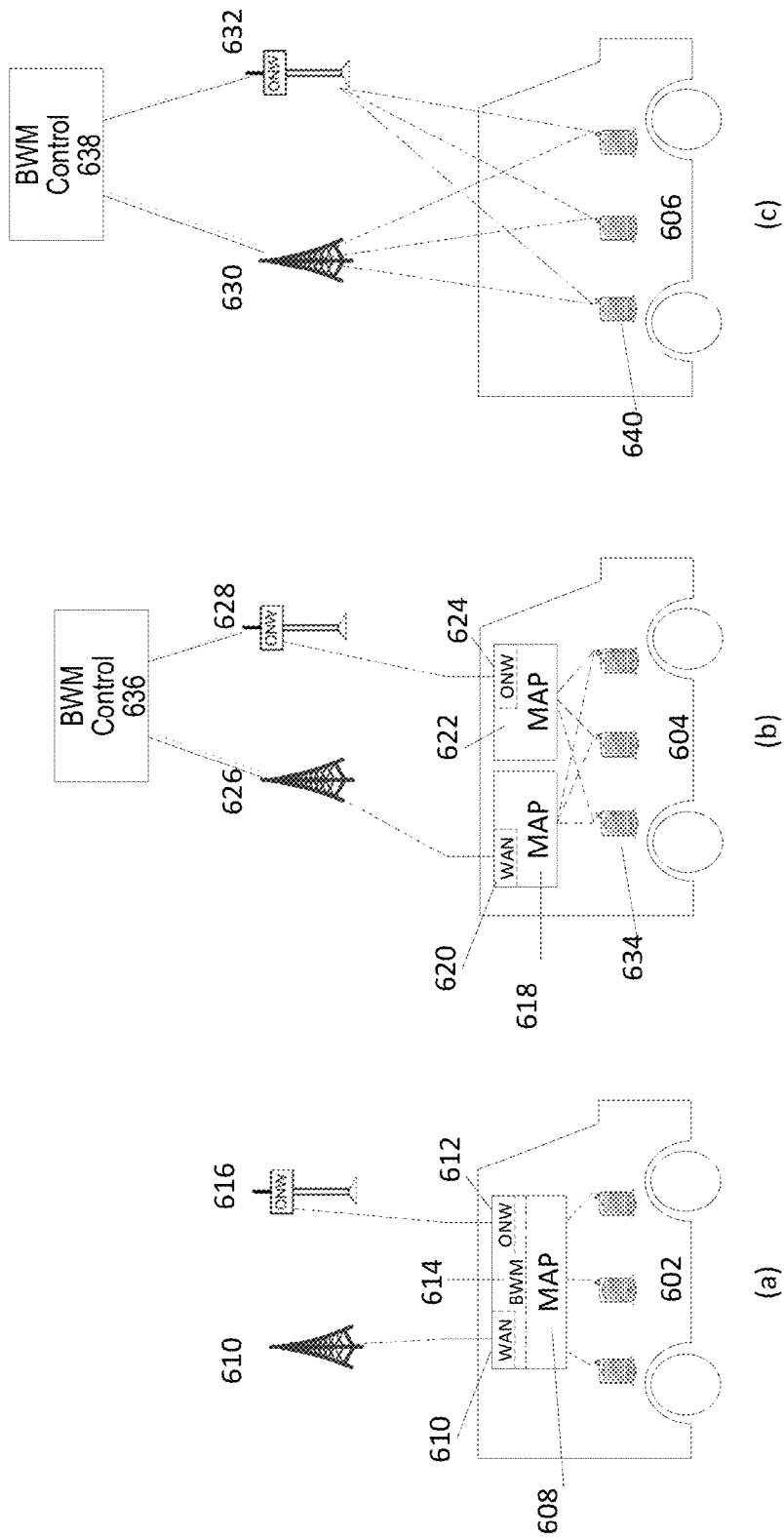
FIGS. 6a-c depicts configurations that may be used for a mobile access point (MAP) and/or a WTRU connection.

FIGS. 6a-c depicts configurations that may be used for a mobile access point (MAP) and/or a WTRU wireless connection. For example, FIGS. 6a-c shows various configurations that may be used for wireless connectivity to passengers' WTRUs.

As shown in FIG. 6a, one or more WTRUs may connect to MAP 608 in vehicle 602 and MAP 602 may provide two backhaul connections; a connection via WAN 610 to base station 610, and a connection via ONW 612 to ONW AP 616.

In FIG. 6b there may be two MAPs in the vehicle, such as MAP 618 and MAP 622. MAP 620 may WAN backhaul via WAN 620 to base station 626. MAP 622 may provide an ONW backhaul via ONW 624 to ONW AP 628. There may not be BWM functionality in MAP 618 or MAP 622. The BWM functions may be split between a BWM client in a WTRU, such as WTRU 634, and BWM Control 636. This may be done, for example, to make it be possible to use standard off-the-shelf devices for the MAPs. For example, the WAN-based MAP may be a femto-access point (FAP) and an ONW-based MAP may provide a Wi-Fi connection. As another example, the WAN-based MAP may be a cellular relay, or equipment similar to what automobile manufacturers have developed for in-vehicle Wi-Fi. The WAN MAP may be any device that assists the WTRUs in connecting to the WAN.

In FIG. 6c, there may not be a MAP and the WTRUs, such as WTRU 640, may use their own RATs to connect to the WAN and ONW. WTRU 640 may support both a cellular RAT and Wi-Fi. The cellular RAT may provide the WAN connection and the Wi Fi may provide the connection back to the ONW. This may be done, for example, to avoid the usage of a MAP. WTRU 640 may include a BWM client that may provide local BWM control, queuing of data for the separate RATs, received data processing, or the like. BWM control may be at WTRU 640, BWM control 638, or split between WTRU 640 and BWM control 638.

As show in FIGS. 6a-6b, a vehicle, such as vehicle 602 and vehicle 604, may be outfitted with a MAP, such as MAP 608, MAP 618, or MAP 622, that may provide LAN connectivity to a WTRU. With respect to FIG. 6c, LAN connectivity may occur between 640 and ONW 632. Referring again to FIGS. 6a-c, the LAN may be a Wi-Fi AP, FAP, or may implement any other RAT. Access to the Internet may be provided by a WAN RAT, an ONW RAT that may be part of the MAP, or the like. Examples of the WAN RAT may be cellular or satellite links. The ONW RAT may be cellular, Wi-Fi, or another wireless technology that may provide a high data rate connection. The ONW connection, rather than a RAT, may be a hardwired connection that may be attached when the vehicle arrives at a terminal.

The WAN and ONW RATs may carry user or control plane data that may traverse, or be used by, the WAN core network or an ONW local network that may forward the data to the Internet or other external networks.

A BWM server may be implemented as part of the MAP, such as at BWM 614, and may control the flow of data between the WTRUs and the RATs, such as WAN 610 and ONW 612. WTRUs, such as WTRU 634, may have BWM client software to interact with one or more MAPs, such as MAP 622 and 618.

A BWM server may be implemented apart from a MAP, such as BWM Control 636 and 638. The BWM Control may be connected to the WAN Core Network, the Internet, a local network associated with the ONW, or the like. The BWM Control function may be implemented by an operator that may provide the mobile wireless service to the users in the vehicle. For example, if a cellular operator provides the service, the BWM Control function may be connected to the Mobile Core Network. If the transportation system operator provides the services, the BWM server may be connected to a local ONW network. If a third party provides the service, the BWM Control function may be connected to the Internet.

Figure 7:
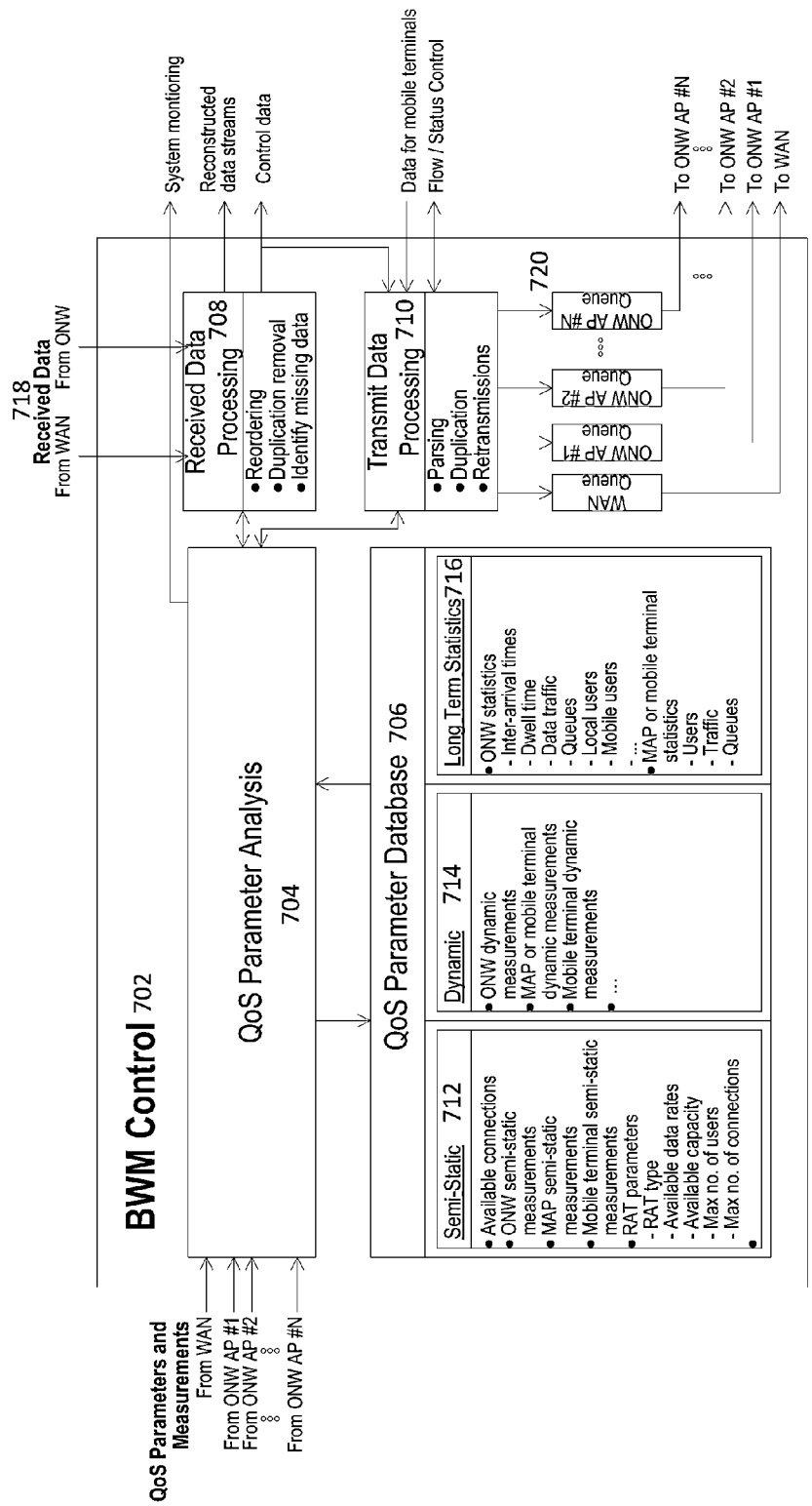
FIG. 7 depicts receive data processing that may be performed by a BWM entity.

FIG. 7 depicts receive data processing that may be performed by a BWM entity, such as BWM Control 702. FIG. 7 shows several BWM Control functions and interconnections, such as QoS Parameter Analysis 704, QoS Parameter Database 706, Received Data Processing 708, and Transmit Data Processing 710. Though the functions may be shown in one diagram, they may be separate functions implemented in different places in the network, on different platforms. For example, the received and transmit data processing may have more latency constraints than the QoS processing since those functions may be in the data path and those functions may be implemented on a different, faster platform.

QoS parameter analysis may be provided by QoS Parameter Analysis 704. The BWM Control may analyze QoS and other measurement data that may be provided by a WAN system, an ONW system, Received Data Processing 708, and/or Transmit Data processing 710. QoS Parameter Analysis 704 may convert raw data to parameters and or formats compatible with the QoS Parameter Database 706 architecture or other subsequent functions. QoS Parameter Analysis 704 may convert the parameters to values that require less storage and less processing by subsequent functions. For example, the analysis may include averaging, finding maximum values, finding minimum values, computing standard deviations or other measures of variability, tracking times, types of status updates, or the like. The QoS Parameter Analysis 704 outputs may be stored in the QoS Parameter Database 706, provided to the Received Data processing 708, or provided to the Transmit Data Processing 710. The data may also be provided to a System Monitoring function, or other process, that may collect or displays data related to overall system performance for diagnostics, manual reconfiguration, or automatic reconfiguration.

QoS Parameter Database 706 may store analyzed data, such as Semi-Static data 712, Dynamic data 714, and Long Term Statistics 716. Other groupings of data elements that may facilitate overall system design may be implemented. For example, the data may be grouped by source (e.g., WAN, ONW AP number, etc.).

Semi-Static data 712 may be expected to vary occasionally. Examples may be equipment online/offline indications, equipment alarms, available capacity, parameters of particular RATs, or the like.

Dynamic Data 714 may be expected to change quickly. Examples may be data traffic volume statistics, traffic demand statistics, status of data queues, vehicle arrival and departure times, vehicle or user connection QoS values (e.g., data rate, data throughput, latency, jitter, security), or the like.

Long Term Statistics 716 may be averages taken over hours or days that represent parameters useful for overall system configuration or reconfiguration. Examples may be inter-arrival times between stations, dwell times at stations, average time-of-day dependent data traffic, queue status, local user count, mobile user count at stations, or the like.

The data entries in QoS Parameter Database 706 may be tagged with time, location, WTRU ID, MAP ID, vehicle ID, ONW AP ID, transportation system terminal ID, or other parameters that may be associated with the source of the data, or may be useful for sorting or subsequent processing.

Receive Data Processing 708 may accept data streams from the WAN and ONW APs at 718 and may reconstruct the data stream or streams associated with an end-to-end connection and may forward the data along the appropriate path. This may involve reordering of data, removing duplicate data, identifying missing data, discarding incorrect data, deciding if missing data is too old such that retransmission requests may no longer worthwhile, or the like. The outputs may include the reconstructed data streams, control messages or signaling, and QoS or other measurement data. The control data may include, for example, retransmission requests for missing data.

Transmit Data Processing 710 may accept the data to be delivered to a WTRU and may direct the data to the particular network radio resources. For example, at 720 the data may be parsed into queues for a WAN and/or several ONW APs. The operations may include parsing of data, duplication of data for possible transmission over multiple paths, retransmission of data that was not received, or the like. Transmit Data Processing 710 may also provide QoS and other measurement data as an output.

Transmit Data Processing 710 may have outputs, or bidirectional flow/status control signals, that may be exchanged with the source of the data to control the amount of data to be accepted from the source for transmission. For example, QoS Parameter Analysis 704 may predict the amount of data that may be transmitted at an anticipated connection event and limit the total data to be queued, or the depth of one or more queues. If the restriction may be violated, or may be close to being violated, Transmit Data Processing 710 may indicate to the data source that no additional data may be accepted. It may also compute an acceptable data rate, and may indicate that rate to the source, thus may adapt the incoming data rate.

Figure 8:
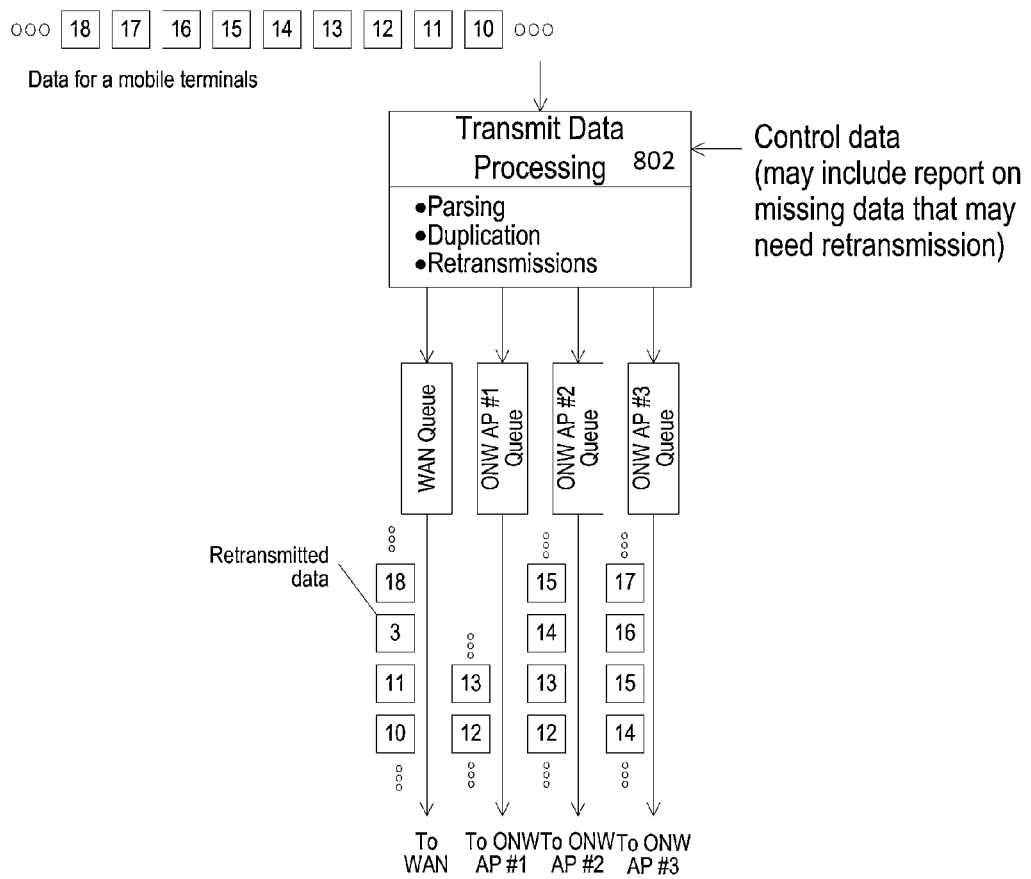
FIG. 8 depicts transmit data processing that may be performed by a BWM entity.

FIG. 8 depicts transmit data processing that may be performed by a BWM entity. For example, FIG. 8 may depict an example of Transmit Data Processing 708, shown with respect to FIG. 7, may operate. Referring again to FIG. 8, a stream of data arrives, shown as blocks labeled 10 to 18. The control input may identify data that may not have been received and may need to be retransmitted. For example, data block labeled 3 may have been retransmitted.

The transmit data processing 802 may direct blocks 10, 11, 3, and 18 to a WAN connection. Blocks 10 and 11 may be the first two blocks that may be part of the incoming stream. Block 3 may be a retransmission. Block 18 may be later in the stream.

Blocks 12 and 13 may be directed to both ONW AP #1 and ONW AP #2. This decision may be based on achieving higher reliability through diversity. Alternatively, the decision may be based on a prediction of when a vehicle may arrive at ONW AP's #1 and #2, along with information about current queue status both at this BWM Control location and at the APs.

Blocks 14 and 15 may be directed to both ONW AP #2 and #3. Blocks 16 and 17 may be directed to ONW AP #3.

Figure 9:
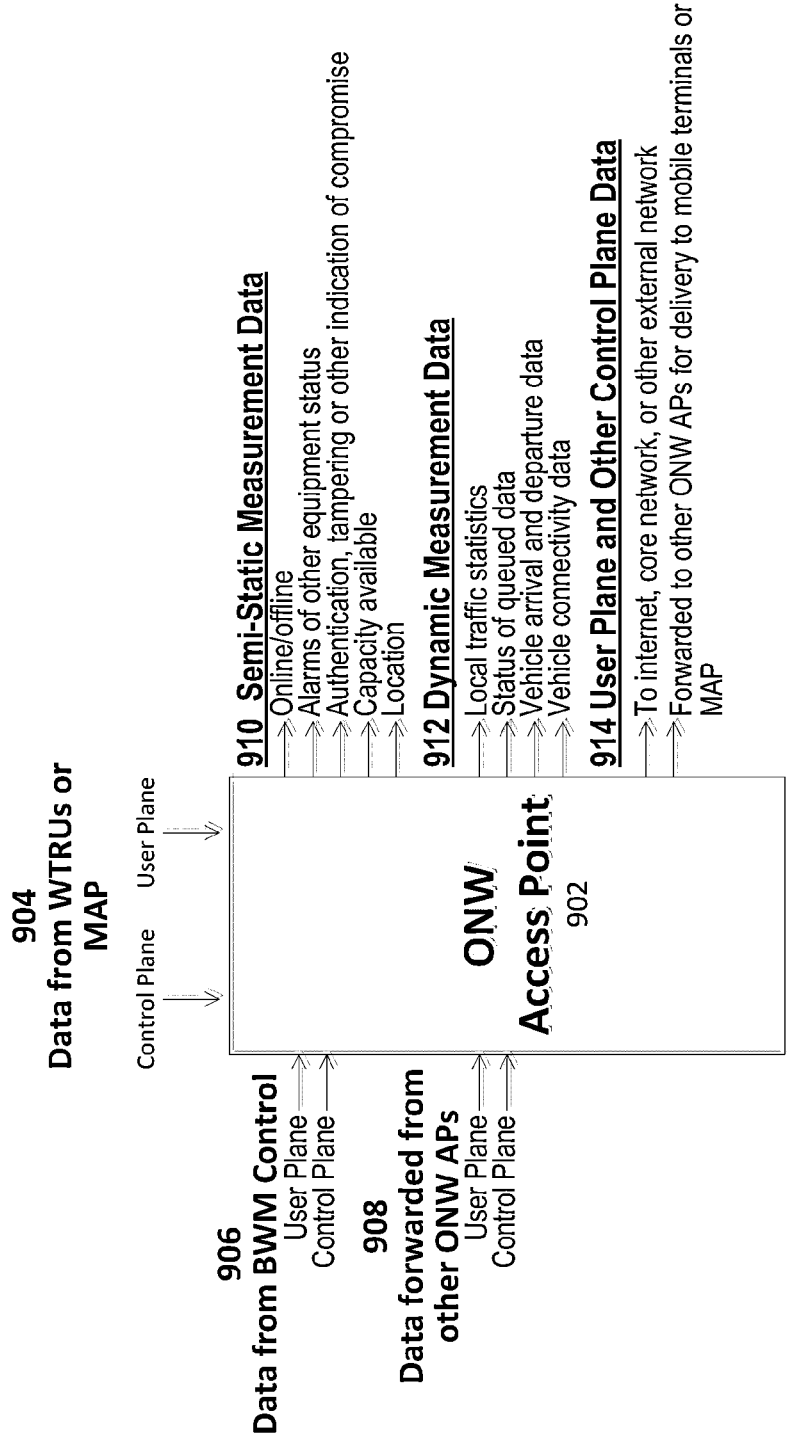
FIG. 9 depicts processing that may occur at an ONW AP.

ONW AP processing may be provided. FIG. 9 depicts processing that may occur at an ONW AP, such as ONW AP 902.

At 904, ONW AP 902 may receive over-the-air data (control plane and user plane) from the WTRUs and MAPS and may forward the data to the Internet, Core Network, or other network. The ONW AP may receive data from the BWM Control at 906 or other APs at 908 and may transmit the data to the MAPs or WTRUs.

For example, Transmit Data Processing, such as Transmit Data Processing 802 shown with respect to FIG. 8 or Transmit Data Processing 710 shown with respect to FIG. 7, may have data that may have been queued and may not have been transmitted during a vehicle connection event. Alternatively, it may have data that may have been transmitted but the AP concludes that it may have not have received it correctly. This may be due, for example, to a lack of an ACK or reception of a NACK. Such data may be forwarded to other ONW APs along the route to provide additional transmit opportunities. The status of that data may be sent via a control message to the BWM Control, which may determine how and if it may be provided with additional transmit opportunities. Similarly, the ONW AP may receive data forwarded from other ONW APs at 908.

ONW AP 902 may receive control data from the BWM Control 906. This may include configuration data, policy rules, instructions for queues to discard or forward data, authentication data, or the like.

ONW AP 902 may compute and may forward measurement data at 914 to the BWM Control function, and possibly to other ONW APs. Similar to the QoS Parameter Database described herein, measurements may be semi-static measurement data and/or dynamic measurement data, though other groupings may be possible. The measurements may include online/offline indications, alarms or other equipment status, authentication data, indications of compromised equipment (suspected rogue activity, viruses, tampering, etc.), available traffic capacity estimates, location data of the ONW AP, local AP traffic statistics, peak traffic demand, average traffic demand, variance or other measurement of variability of demand, peak packet delay, average packet delay, variance or other measure of variability of packet delay, status of data queues, vehicle data, vehicle ID arrival and departure times, or the like. The measurements may also include connection and disconnection times, connection statistics (peak, average, standard deviation or other measure of variability), connection duration, connection data rate, latency, location data, or the like.

The measurements may be time stamped, periodic, or event triggered. Examples of events that may trigger reports may be data changing by a certain percentage, a vehicle arrival, a vehicle departure, a vehicle connection, a vehicle disconnection, an equipment failure or other fault, authentication failure or indication of compromised equipment or software, an alarm due to tampering, or the like.

Figure 10:
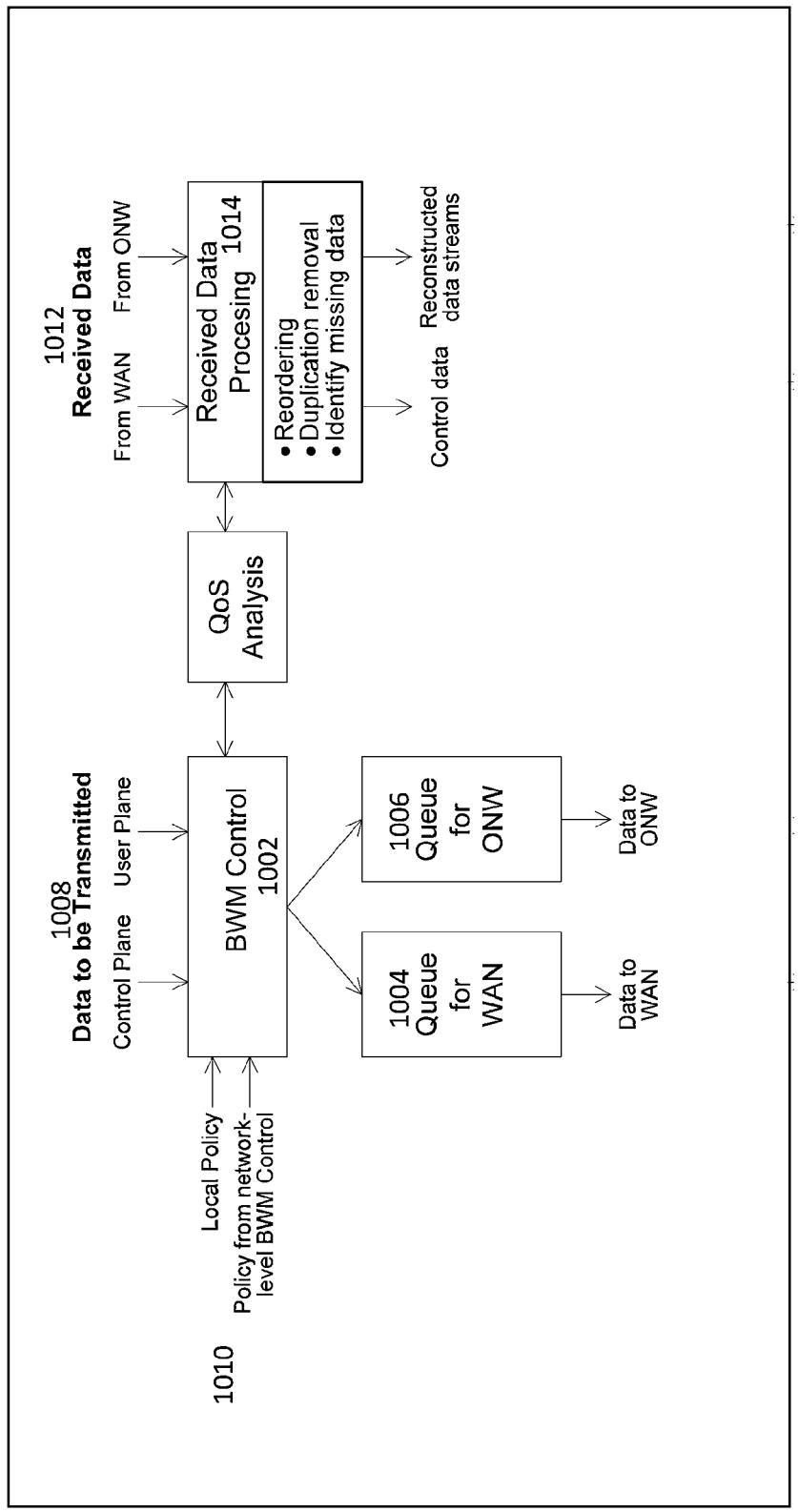
FIG. 10 depicts processing that may occur at a MAP or a WTRU.

FIG. 10 depicts processing that may occur at a MAP or a WTRU. A MAP or a WTRU may implement BWM functions described herein. This may be done, for example to reduce complexity as a MAP may service the WTRUs in the vehicle and may prepare for transmission to the next ONW AP.

On the transmit side, at 1010, BWM Control 1002 may have local policy inputs and may have policy inputs from network-level BWM control. At 1008, BWM Control 1002 may receive control plane and user plane data. The data to be transmitted may be directed to either a queue for the WAN at 1004 or a queue for the next ONW AP at 1006. This processing may implement any of the functions in the transmit processing as described herein, such as transmit processing function shown with respect to FIG. 8. Referring again to FIG. 10, this may include, for example, duplication and retransmission. It may also include queues that may be used to prepare data for ONW APs that may be further down the transportation route.

At 1012, received data may come from the WAN or from one or more ONW APs. Received Data Processing 1014 may implement any of the functions in the receive processing described herein with respect to FIG. 7. Referring again to FIG. 10, for a WTRU, the reconstructed data stream may be provided to the higher layers of the protocol stack. For a MAP, the reconstructed data may be provided to the LAN RAT for transmission to the WTRUs in the vehicle.

BWM policy considerations may be provided. BWM Policy may be implemented or enforced at the network level, at the MAP level, at the WTRU level, or at the ONW AP. The BWM policy may be enforced by the BWM Control entity, the BWM Server entity, or other entity in the system. The policy may be enhanced to handle the different characteristics of the WAN that may be expected to be continuously available and the ONW that may be expected to be intermittent, but when connected, may offer a higher data throughput.

The system may face applications that have widely different QoS requirements. For example, Table 1 shows QoS Class Indicators (QCIs) that may be used for the Long Term Evolution (LTE) cellular system.

TABLE 1

| QCI | RESOURCE TYPE | PRIORITY | PACKET DELAY BUDGET (MS) | PACKET ERROR LOSS RATE | EXAMPLE SERVICES |
|---|---|---|---|---|---|
| 1 | GBR | 2 | 100 | $10^{-2}$ | Conversational voice |
| 2 | GBR | 4 | 150 | $10^{-3}$ | Conversational video (live streaming) |
| 3 | GBR | 5 | 300 | $10^{-6}$ | Non-conversational video (buffered streaming) |
| 4 | GBR | 3 | 50 | $10^{-3}$ | Real-time gaming |
| 5 | Non-GBR | 1 | 100 | $10^{-6}$ | IMS signaling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP-based (for example, WWW, e-mail), chat, FTP, p2p file sharing, progressive video and others |
| 9 | Non-GBR | 9 | 300 | $10^{-6}$ | |

The system may choose to use a finer partition. For example, QCI 8 includes e-mail, ftp, and chat. It may be acceptable to defer large ftp downloads or e-mail to ONW connectivity events, or service it at a very low data rate on the WAN with a sudden burst during ONW connectivity. Chat, on the other hand, may not be a good candidate for that type of deferral.

There may be other possible decisions on which RAT the system may use to send a data flow. For example, the system may send both directions of the flow on the WAN; the flow may achieve the WAN QoS.

The system may send both directions of the flow on the ONW. The flow may be queued between ONW connection events, but may get a high-speed burst rate when a connection occurs.

The system may send part of the flow on the WAN and the rest on the ONW. The WAN may provide a continuous connection. At an ONW connection, a temporary high rate connection may be provided. The system may use its knowledge of the transportation route, the available capacity on a RAT and at the ONW AP, the arrival statistics at ONW connection points, and other measurements to predict the amount of data to forward to an ONW AP.

The system may send one direction on the WAN and the other direction on the ONW. This may work well for a request/response service where the response may have a high throughput requirement. For example, a request for a large file downloads. The request, which may be a small data block, may go out on the WAN. The response may be queued for the ONW for a fast download during a connection event. If the download may not complete during the connection event, the data may be forwarded along the transportation path to be downloaded at subsequent connection events. The system may use its knowledge of the transportation route to forward the data to the proper ONW APs.

The system may send one direction on the WAN and the other direction on the ONW for a fixed time duration. The system may set criteria for total time or average throughput for a flow. The criteria may be expected to be achieved after, for example, two ONW connection events. If that does not happen after the two events, or timer expiring, the flow may be switched to the WAN, in both directions. Similarly, if the WAN may not provide an adequate QoS the system may change the parameters to utilize one or more ONW connection events that may or may not be contiguous.

The system may send control plane data on the WAN and user plane data on the WAN and ONW, or just the ONW. If there may be more confidence in the reliability of the WAN, there may be an advantage to sending control and measurements data on the WAN.

The system may send data, or parts of the data, based on the security of the RAT. Security policies of the WAN, or certain ONW APs, may be considered and it may be more acceptable to send data through those connections. Security data may be collected as part of the authentication processes between the ONW APs and the network, which may exchange information such as authentication failures, equipment alarms, or other indications of compromise or failure. A policy input may be a parameter that indicates the trust level of a RAT or an ONW AP.

The system may establish a threshold on data block size, at or below the threshold use the WAN, above the threshold use the ONW, or vice versa. The system may establish a threshold on data latency. If estimated, predicted or measured performance may at or below the threshold, the WAN may be used. Otherwise, the ONW may be used, or vice versa. The system may establish a threshold on an average data rate. If estimated, predicted or measured performance may be at or below the threshold, the WAN may be used. Otherwise, the ONW may be used, or vice versa. The system may establish a threshold on average jitter. If estimated, predicted or measured performance may be at or below the threshold use the WAN. Otherwise, the ONW may be used, or vice versa. The system may establish a threshold on average latency. If estimated, predicted or measured performance may be at or below the threshold, the WAN may be used. Otherwise, the ONW may be used, or vice versa Combinations of the above policies may also be used. A policy applied to a particular flow may be changed either due to a failure to meet desired QoS, exceeding the desired QoS, network conditions (connectivity, available capacity, etc.) that may impact the selected policy decision, or a timeout that may be applied to a policy.

A number of the policies may be based on setting a threshold on a parameter. Other statistics related to the parameter may also be used. Using data rate as an example, some alternatives may be a threshold may be set on the average rate, on the peak rate, on the minimum rate, on the standard deviation, or other measure of variability or jitter, or on the percentage of the resource available to the full network that is being consumed by the particular flow.

Several of the policies may depend on measurements and analysis of the measured data that may be computed as part of local or network level BWM Control. For example, some of the policies may use the estimated or predicted quantities, such as the transportation route and the particular ONW APs along the route. This may be done, for example, so that data may be forwarded along the route. Connectivity and traffic statistics at an ONW connection point may also be used. This may be done, for example, so that the quantity of data that may be exchanged at a stop may be predicted. The arrival times at ONW connection points may be used. This may be done, for example, so that the latency or average throughput may be estimated.

The transportation route of a vehicle through the network may be provided based on known schedules. It may also be learned by analyzing arrival and departure data tagged with vehicle or route identification tags.

WTRU connection manager considerations may be provided. WTRUs may have connection manager software, which may be enhanced to support the combined WAN plus ONW system. If the system may be branded by, for example, the transportation system operator, an indication may be provided on the WTRU to advertise the system and show that the combined network may be used. This may serve to inform the WTRU user that the connection characteristics may be good, but may not be the same as a continuous high-speed connection. Indications on the WTRU may display when the multiple connections may be available and the estimated time to the next high speed connection event.

Single user heterogeneous network use may be provided. Embodiments disclosed herein may provide for the combination of continuously available connections and ONWs. Although the embodiments may have been described in terms of a MAP that may service multiple users in, for example, a bus, train, airplane or other vehicle, the embodiments may also apply to a single user. For example, the embodiments may apply to a single user that may traverse a path that may come in and out of connectivity with, for example, a series of hot spots or other small cells in a heterogeneous network. In this case, there may not be a MAP, but the BWM may interact on a single-user basis with the multi-RAT capability of a WTRU. This may be similar to FIG. 6c.

For example, a person who travels the same route to work, has cellular coverage during most of the trip, but may come in and out of connectivity with a series of local hotspots. A BWM server may recognize this pattern and may apply the technology. The concept of a learned transportation route may be extended to any approximately repeated mobility route.

As another example, a person on a long one-time trip along a lengthy highway, may have cellular coverage during most of the trip, but may come in and out of connectivity with a series of non-overlapping small cells or hot spots that may provide high throughput for short intervals as the vehicle passes through a coverage area. The learning may be different here in that the BWM system may infer the vehicle may be on the highway from the connectivity events. Future connectivity events may be predicted based on an assumption of the vehicle remaining on the highway. The algorithms may include logic to conclude when the vehicle may exit the highway, for example, by recognizing that the anticipated connection events may not occur. This may cause the enhanced multi-connection service to be dropped. The concept of the learned transportation route may be based on characteristics of a known highway that may be preconfigured, or learned based on data collected from other vehicles.

Although features and elements are described above in particular combinations, one of ordinary skill in the art will appreciate that a feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A bandwidth management (BWM) controller comprising:
   a processor, the processor configured to:
      receive a request for a data stream;
      determine an opportunistic network access point (ONW AP) in proximity to a route;
      determine that a first portion of the data stream should be received via the ONW AP and a second portion of the data stream should be received via a wide access network access point (WAN AP);
      receive the first portion of the data stream via the ONW AP and the second portion of the data stream via the WAN AP; and
      generate a reconstructed data stream from the first portion of the data stream and the second portion of the data stream.

2. The BWM of claim 1, wherein the processor is further configured to send the reconstructed data stream to a device that sent the request for the data stream.

3. The BWM of claim 1, wherein the processor is configured to generate the reconstructed data stream by:
   combining the first portion of the data stream and the second portion of the data stream to form a combined data stream; and
   generating the reconstructed data stream by removing duplicate data and repairing errors in the combined data stream.

4. The BWM of claim 1, wherein the processor is further configured to determine that the first portion of the data stream should be received via the ONW AP by analyzing a characteristic of the request for the data stream.

5. The BWM of claim 1, wherein the processor is further configured to determine that the first portion of the data stream should be received via the ONW by determining that the ONW AP provides an improved quality of service, an improved data rate, or a lower latency than the WAN AP.

6. The BWM of claim 1, wherein the processor is further configured to:
   receive a first quality of service (QoS) measurement for the WAN AP; and
   receive a second QoS measurement for the ONW AP.

7. The BWM of claim 6, wherein the processor is further configured to determine that the first portion of the data stream should be received via the ONW using the first QoS measurement and the second QoS measurement.

8. The BWM of claim 1, wherein the processor is configured to determine the ONW AP in proximity to the route by:
   determining a position for a device that sent the request for the data stream;
   determining the route using the position; and
   selecting the ONW AP from one or more potential ONW APs in proximity of the route.

9. The BWM of claim 1, wherein the processor is configured to determine the ONW AP in proximity to the route by:
   determining a current position and a direction of travel for a device that sent the request for the data stream;
   determining the route by comparing the current position and the direction of travel to a map; and
   selecting the ONW AP from one or more potential ONW APs in proximity to the route.

10. The BWM of claim 1, wherein the processor is configured to determine the ONW AP in proximity to the route by:
  determining an estimated time of arrival based on a current location and a direction of travel for a device that sent the request for the data stream; and
  determining the ONW AP using the estimated time of arrival.

11. A bandwidth management (BWM) controller comprising:
  a processor, the processor configured to:
    receive a request for a data stream;
    determine an opportunistic network access point (ONW AP) in proximity to a route;
    determine that a first portion of the data stream should be sent via the ONW AP and a second portion of the data stream should be sent via a wide access network access point (WAN AP);
    send the first portion of the data stream via the ONW AP and the second portion of the data stream via the WAN AP.

12. The BWM of claim 11, wherein the processor is further configured to determine that the first portion of the data stream should be sent via the ONW AP by analyzing a characteristic of the request for the data stream.

13. The BWM of claim 11, wherein the processor is further configured to determine that the first portion of the data stream should be sent via the ONW by determining that the ONW AP provides an improved quality of service, an improved data rater, or a lower latency than the WAN AP.

14. The BWM of claim 11, wherein the processor is further configured to:
  receive a first quality of service (QoS) measurement for the WAN AP; and
  receive a second QoS measurement for the ONW AP.

15. The BWM of claim 14, wherein the processor is further configured to determine that the first portion of the data stream should be sent via the ONW using the first QoS measurement and the second QoS measurement.

16. The BWM of claim 11, wherein the processor is configured to determine the ONW AP in proximity to the route by:
  determining a position for a device that sent the request for the data stream;
  determining the route using the position; and
  selecting the ONW AP from one or more potential ONW APs in proximity of the route.

17. The BWM of claim 11, wherein the processor is configured to determine the ONW AP in proximity to the route by:
  determining a current position and a direction of travel for a device that sent the request for the data stream;
  determining the route by comparing the current position and the direction of travel to a map; and
  selecting the ONW AP from one or more potential ONW APs in proximity to the route.

18. The BWM of claim 11, wherein the processor is configured to determine the ONW AP in proximity to the route by:
  determining an estimated time of arrival based on a current location and a direction of travel for a device that sent the request for the data stream; and
  determining the ONW AP using the estimated time of arrival.

* * * * *